(12) United States Patent
Wu

(10) Patent No.: US 7,961,782 B2
(45) Date of Patent: Jun. 14, 2011

(54) INTERFERENCE SUPPRESSION PROCESSING UNIT AND A METHOD OF SUPPRESSING INTERFERENCE IN WIRELESS DATA COMMUNICATION

(75) Inventor: Xiaofeng Wu, Neubiberg (DE)

(73) Assignee: Infineon Technologies AG, Neubiberg (DE)

( * ) Notice: Subject to any disclaimer, the term of this patent is extended or adjusted under 35 U.S.C. 154(b) by 1009 days.

(21) Appl. No.: 11/757,882

(22) Filed: Jun. 4, 2007

(65) Prior Publication Data

US 2008/0298521 A1     Dec. 4, 2008

(51) Int. Cl.
*H03H 7/30* (2006.01)
*H04B 7/08* (2006.01)

(52) U.S. Cl. ........................................ 375/233; 375/347

(58) Field of Classification Search .................. 375/144, 375/148, 231–233, 235, 346, 347, 350
See application file for complete search history.

(56) References Cited

U.S. PATENT DOCUMENTS

| | | | |
|---|---|---|---|
| 5,798,795 A * | 8/1998 | Glenn et al. | 375/240.11 |
| 6,314,147 B1 | 11/2001 | Liang et al. | |
| 6,466,616 B1 * | 10/2002 | Stenstrom et al. | 375/233 |
| 6,697,351 B1 | 2/2004 | Kuzminskiy et al. | |
| 7,340,016 B2 * | 3/2008 | Hui | 375/347 |
| 2002/0141437 A1 * | 10/2002 | Meyer et al. | 370/442 |
| 2007/0161362 A1 * | 7/2007 | Mattellini | 455/307 |
| 2008/0232439 A1 * | 9/2008 | Chen | 375/148 |

FOREIGN PATENT DOCUMENTS

EP     1 404 046 B1     3/2004

OTHER PUBLICATIONS

"Equalization Concepts for EDGE", Wolfgang H. Gerstacker and Robert Schober, IEEE Transactions on Wireless Communications, vol. 1, No. 1, Jan. 2002, pp. 190-199.
"Joint Equalization and Interference Suppression for High Data Rate Wireless Systems", Sirikiat Lek Ariyavistakul, Jack H. Winters and Nelson R. Sollenberger, IEEE Journal on Selected Areas in Communications, vol. 18, No. 7, Jul. 2000, pp. 1214-1220.
"A Two-Stage Hybrid Approach for CCI-ISI Reduction with Space-Time Processing", Jen-Wei Liang, Jiunn-Tsair Chen and Arogyaswami J. Paulraj, IEEE Communication Letters, vol. 1, No. 6, Nov. 1997, pp. 163-165.
"Space-time Filtering with Suppression of Asynchronous Co-channel Interference", Alexandr M. Kuzminskiy and Paul Strauch, IEEE, 2000, pp. 385-389.

* cited by examiner

*Primary Examiner* — Young T. Tse
(74) *Attorney, Agent, or Firm* — Eschweiler & Associates, LLC

(57) ABSTRACT

The interference suppression processing unit includes $N_a \geq 1$ receiver paths to transmit respective $N_a \geq 1$ received data sequences received from respective $N_a \geq 1$ antennas, and a signal generation unit to generate $K \geq N_a$ signal data sequences from the received data sequences. The interference suppression processing unit also includes $K \geq N_a$ signal paths that each transmit one of the signal data sequences, a prefilter unit in each one of the signal paths, and a combiner having $K \geq N_a$ input terminals each one connected to an output terminal of one of the prefilter units.

28 Claims, 5 Drawing Sheets

INTERFERENCE SUPPRESSION PROCESSING UNIT AND A METHOD OF SUPPRESSING INTERFERENCE IN WIRELESS DATA COMMUNICATION

FIELD OF THE INVENTION

The present invention relates to an interference suppression processing unit, an interference suppression and equalization processing unit, a method of suppressing interference of a received data signal in wireless data communication and a method of suppressing interference of a received data signal and equalizing the received data signal in wireless data communication.

BACKGROUND OF THE INVENTION

In a cellular network, multiple wireless users within a designated area, or cell, communicate with a single base station. In a time division multiple access (TDMA) cellular network, each user communicates with the base station in a time-multiplexed fashion. In other words, each user is allocated a slice of time during which it exchanges a burst of data with the base station wherein a burst is a sequence of digital symbols representing the data. The user must then wait until the other users have exchanged their bursts of data with the base station before exchanging its next burst of data.

The quality of communication in a cellular network can be degraded by a variety of factors. Three important factors are multi-path fading, interference, and noise. These factors can significantly degrade the quality of communication leading to an increase of the bit-error-rate.

One type of multi-path fading occurs when reflections of the transmitted signal arrive at the receiver delayed in time relative to one another. If the relative time delays are a significant portion of a symbol period, then inter-symbol interference (ISI) is produced, wherein the received signal simultaneously contains information from several superimposed symbols.

Another factor that can corrupt the received signal at the receiver is channel interference, in particular co-channel interference (CCI). The increased capacity in a cellular network, compared with a network with a single transmitter, comes from the fact that the same radio frequency can be re-used in a different area for a completely different transmission. If there is a single plane transmitter, only one transmission can be used on any given frequency. Unfortunately, there is inevitably some level of interference from the signal from the other cells which use the same frequency. This means that without any measures for suppressing the interference, there must be at least a one cell gap between cells which re-use the same frequency. The frequency re-use factor is the rate at which the same frequency can be used in the network. The frequency re-use factor is given as 1/n where n is a number of cells which can not use the same frequency for transmission. A common value for the frequency re-use factor is 7.

In other words, CCI is the result of receiving the desired signal along with other signals which were transmitted from other radios but occupy the same frequency band as the desired signal. A direct source of CCI is signal energy from other radios operating at the same frequency band as the desired signal. For example, a cellular radio in a distant cell operating at the same frequency can contribute CCI to the received signal in the cell of interest. An indirect source of CCI is adjacent channel interference (ACI) which is the result of side-band signal energy from radios operating at neighbouring frequency bands that leaks into the desired signal frequency band.

For increasing the capacity in the cellular network, it is generally desirable to decrease the frequency re-use factor, in particular to have a frequency re-use factor of 1. However, without the implementation of methods for suppressing the interference a reduction of the frequency re-use factor is not possible. Any wireless communication terminal should therefore be enabled to efficiently suppress interference signals from neighbouring terminal stations.

BRIEF DESCRIPTION OF THE DRAWINGS

Aspects of the invention are made more evident in the following detailed descriptions of embodiments when read in conjunction with the attached drawing figures, wherein.

DETAILED DESCRIPTION OF THE INVENTION

Figure 1:
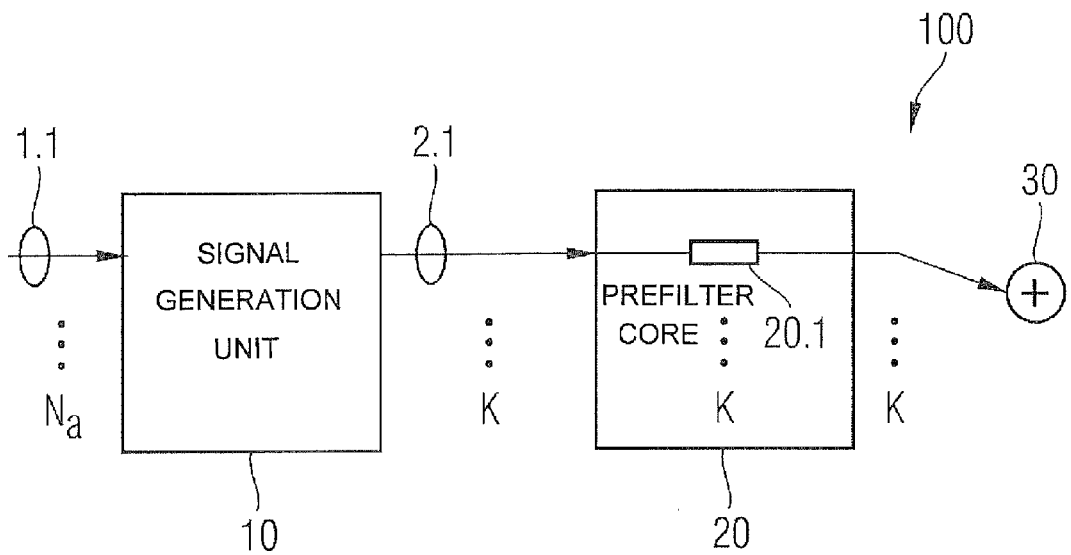
FIG. 1 shows a schematic representation of an embodiment of an interference suppression processing unit.

The aspects and embodiments of the invention are now described with reference to the drawings, wherein like reference numerals are generally utilized to refer to like elements throughout. In the following description, for purposes of explanation, numerous specific details are set forth in order to provide a thorough understanding of one or more aspects of embodiments of the invention. It may be evident, however, to one skilled in the art that one or more aspects of the embodiments of the invention may be practiced with a lesser degree of the specific details. In other instances, known structures and devices are shown in block diagram form in order to facilitate describing one or more aspects of the embodiments of the invention. The following description is therefore not to be taken in a limiting sense, and the scope of the invention is defined by the appended claims.

Referring to FIG. 1, there is shown a schematic representation of an embodiment of an interference suppression processing unit in a block diagram form. The processing unit 100 may be part of the circuitry of a wireless communication terminal, i.e. a base station terminal or a mobile station terminal. The wireless communication terminal comprises $N_a$ antennas wherein $N_a \geq 1$. The processing unit 100 comprises respective $N_a$ receiver paths $1.1, \ldots, 1.N_a$ wherein each one of the receiver paths $1.1, \ldots, 1.N_a$ is coupled with one of the $N_a$ antennas, respectively. The processing unit 100 further comprises a signal generation unit 10 to generate K signal data sequences from the $N_a$ received data sequences wherein $K \geq N_a$. The signal generation unit 10 comprises $N_a$ input ports coupled with the $N_a$ receiver paths $1.1, \ldots, 1.N_a$ to input the received data sequences. The signal generation unit 10 further comprises K output ports to output the generated K signal data sequences. The K output ports are connected with respective K signal paths 2.1, ..., 2.K.

The processing unit 100 further comprises K prefilter units 20.1, ..., 20.K wherein each one of the prefilter units 20.1, ..., 20.K is arranged in one of the signal paths 2.1, ..., 2.K. The processing unit 100 further comprises a combiner 30, comprising K input terminals wherein each one of the K input terminals is connected to an output terminal of one of the prefilter units 20.1, ..., 20.K, respectively.

According to one embodiment, the signal generation unit 10 is configured to generate $K_1$ first signal data sequences wherein each one of the $K_1$ signal data sequences is identical to one of the received data sequences 1.1, ..., 1.$N_a$, respectively. The signal generation unit 10 is further configured to generate $K_2$ second signal data sequences wherein each one of the second signal data sequences is not identical to one of the received data sequences 1.1, ..., 1.$N_a$ respectively. The parameters $K_1$, $K_2$ and K are related to each other by the equation $K_1+K_2=K$. In other words, when it has been stated above that the signal generation unit 10 generates signal data sequences, the term "generate" may have a very general meaning. The signal generation unit 10 "generates" the first signal data sequences in fact by leaving some of the received data sequences unchanged and delivering the unchanged received data sequences to output terminals of the signal generation unit 10. The first signal data sequences thus pass through the signal generation unit 10. The second data sequences, however, are generated within the signal generation unit 10 by performing particular operations on the received data sequences 1.1, ..., 1.$N_a$, in particular extracting specific data out of the received data sequences 1.1, ..., 1.$N_a$ in one embodiment. The first $K_1$ signal data sequences might thus be called real antenna data and the second $K_2$ signal data sequences might be called virtual antenna data.

In a further embodiment of the above described embodiment each one of the $K_2$ signal data sequences may be comprised of one of the following: a real part of one of the received data sequences, an imaginary part of one of the received data sequences, one of the polyphases of one of the received data sequences, a real part of one of the polyphases of one of the received data sequences, and an imaginary part of one of the polyphases of one of the received data sequences. Also linear combinations of the above may be formed. Anyone of the polyphases of one of the received data sequences, in particular the first or the second polyphase, might be selected in one embodiment. However, it can also be that only the best polyphase in terms of sampling timing error is selected, i.e. the polyphase that yields the lowest sampling timing error.

In a further embodiment the signal generation unit 10 is configured such that K is a fixed and predetermined value. The advantage of such a configuration would be that the number of output terminals of the signal generation unit, the number of the signal paths 2.1 ... 2.K and also the number of the prefilter units 20.1 ... 20.K would be always the same and could therefore be pre-configured in hardware or software without the necessity to change them based dependence on the situation and the circumstances. Therefore a prefilter core 20, as is also depicted in FIG. 1, could be pre-configured which would never be changed so that in case of software or firmware implementations a lot of calculation time, memory sizes could be saved as compared to configurations in which the value K would always be dependent on the specific interference and/or antenna situation. In the embodiment as described here, even in a case in which the wireless station comprises two or more antennas, the value of K is always the same independent of how many of the antennas are actually in operation.

Figure 2:
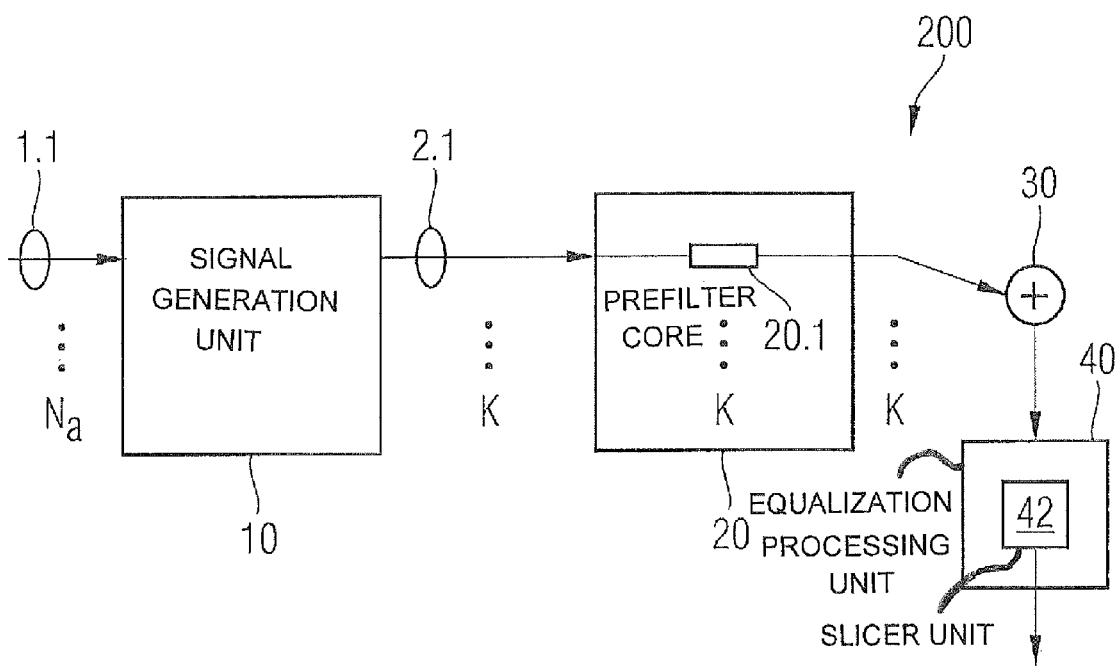
FIG. 2 shows a schematic representation of an embodiment of an interference suppression and equalization processing unit.

Referring to FIG. 2, there is shown a schematic representation of an embodiment of an interference suppression and equalization processing unit in a block diagram form. The processing unit 200 comprises an interference suppression processing unit 100 corresponding to the one as depicted in FIG. 1 and an equalization processing unit 40. The equalization unit 40 comprises an input terminal connected to an output terminal of the combiner 30, a slicer unit 42, and an output terminal. In one embodiment the slicer unit 42 can be implemented as a Viterbi equalizer. With the equalization processing unit 40 it is possible to reject or reduce the inter-symbol interference (ISI). The same embodiments as were described in connection with the interference suppression processing unit of FIG. 1 can also be implemented with the interference suppression and equalization processing unit of FIG. 2.

Figure 3:
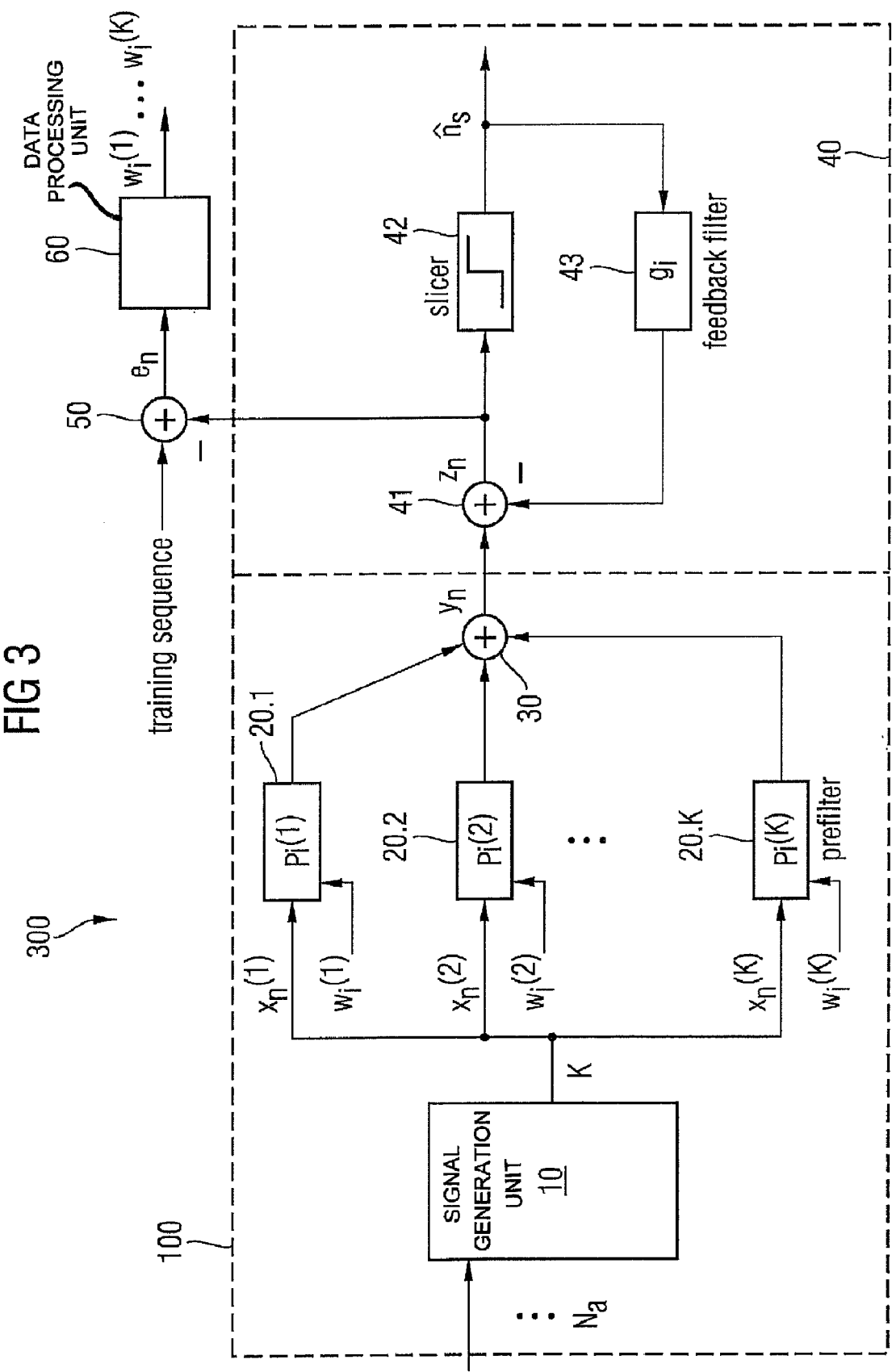
FIG. 3 shows a schematic representation of a further embodiment of an interference suppression and equalization processing unit.

Referring to FIG. 3, there is shown a schematic representation of a further embodiment of an interference suppression and equalization processing unit in a block diagram form. The interference suppression and equalization processing unit 300 comprises an interference suppression processing unit 100 and an equalization processing unit 40. The interference suppression processing unit 100 corresponds to the one which has already been described in connection with FIG. 1. Accordingly, in one embodiment the interference suppression processing unit 100 comprises a signal generation unit 10, prefilter units 20.1 ... 20.K and a first combiner 30. The equalization processing unit 40 comprises a second combiner 41, a slicer unit 42, and a feedback filter unit 43. An output of the second combiner 41 is connected to an input of the slicer unit 42, and an output of the slicer unit 42 is connected to an input of the feedback filter unit 43. An output of the first combiner 30 is connected to a first input of the second combiner 41, and an output of the feedback filter unit 43 is connected to a second input of the second combiner 41.

The interference suppression and equalization processing unit 300 also comprises a third combiner 50. A first input terminal of the third combiner 50 is connected to an output terminal of the second combiner 41, and a second input terminal of the third combiner 50, serves to input the known training sequence as will be outlined in detail further below. The training sequence can be stored in a memory such as, for example, a read-only-memory, or any other suitable storage medium. The sign of the output signal of the second combiner 41 is changed when inputting it to the first input terminal of the third combiner 50 so that in fact in the third combiner 50 a difference signal between the training sequence and the output signal of the second combiner 41 is formed. The output signal of the second combiner 41 is thus subtracted from the known training sequence in the third combiner 50 so that during reception of the training sequence, which, for example, consists of 26 training symbols in the midamble of a burst of the received signal, the output signal of the third combiner 50 is an error signal $e_n$ which can be used to adjust the coefficients of the prefilter units 20.1, ..., 20.K. Accordingly the error signal $e_n$ is input to an input terminal of a data processing unit 60 in which K coefficients or weight factors $w_i^{(1)} \ldots w_i^{(K)}$ are calculated which are input into the prefilter units 20.1 ... 20.K. In one embodiment the weight factors $w_i$ can be calculated such that the error signal $e_n$ or some function of it like the mean square error becomes minimum.

Figure 4:
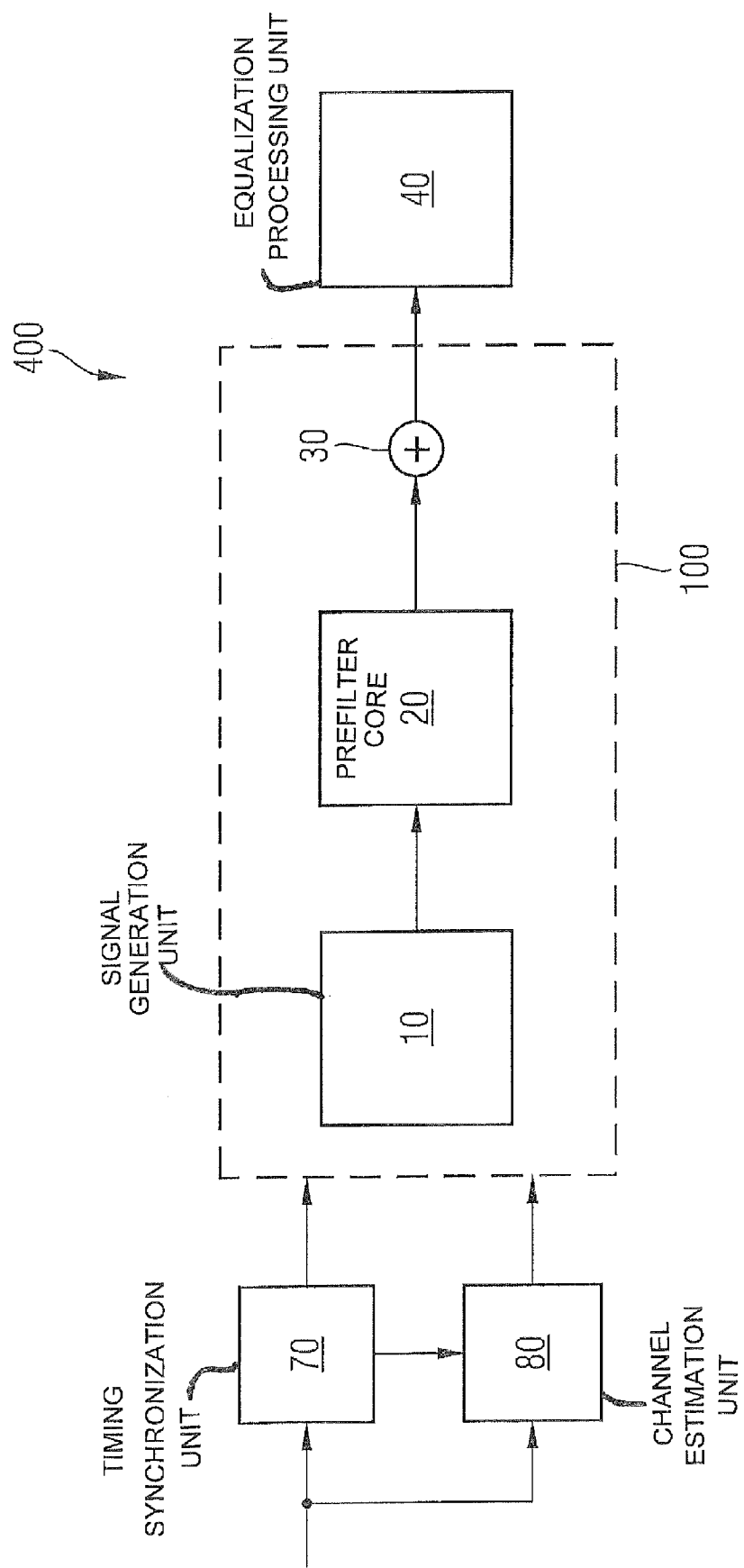
FIG. 4 shows a schematic representation of a further embodiment of an interference suppression and equalization processing unit.

Referring to FIG. 4, there is shown a schematic representation of a further embodiment of an interference suppression and equalization processing unit in a block diagram form. The processing unit 400 comprises an interference suppression processing unit 100 corresponding to the one as depicted in FIG. 1 and an equalization processing unit 40. The interference suppression processing unit 100 thus comprises a signal generation unit 10, a prefilter core 20 and a combiner 30. The equalization processing unit 40 may have the same constitution as that one depicted in FIG. 3 and described above. The processing unit 400 also comprises a timing synchronization unit 70 and a channel estimation unit 80. The received data sequences from the $N_a \geq 1$ antennas are first input into the timing synchronization unit 70 and into a first input of the channel estimation unit 80. An output of the timing synchronization unit 70 is connected with a second input of the channel estimation unit 80 to input therein synchronization information. An output of the timing synchronization unit 70 is connected with a first input of the interference suppression processing unit 100 and an output of the channel estimation unit 80 is connected with a second input of the interference suppression processing unit 100.

Figure 5:
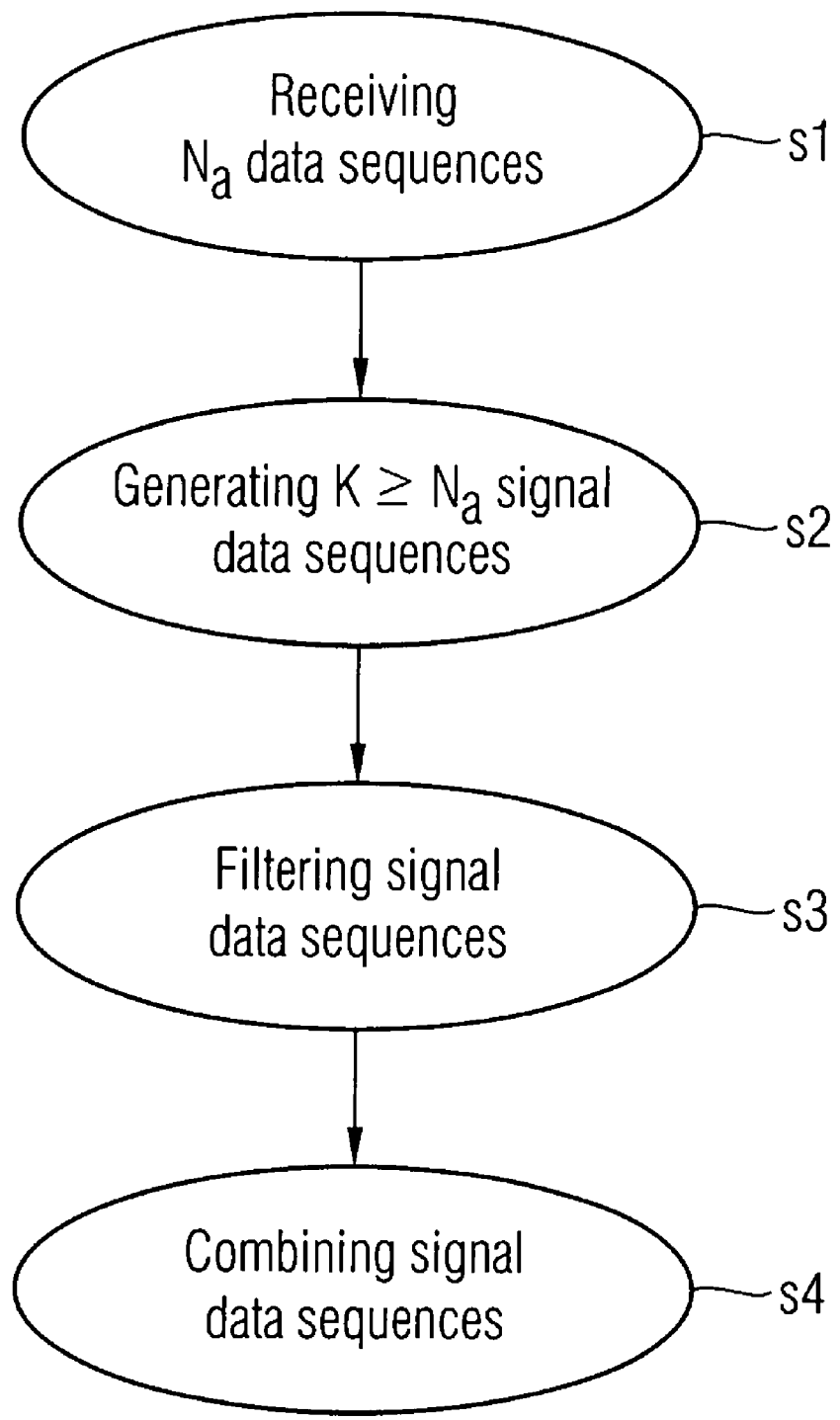
FIG. 5 shows a flow diagram of an embodiment of a method of suppressing interference of a received data signal in wireless data communication.

Referring to FIG. 5, there is shown a flow diagram of an embodiment of a method for suppressing interference of a received data signal in wireless data communication. While the method and other methods of the invention are illustrated and described below as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated actions may be required to implement a methodology in accordance with the invention. At s1, $N_a \geq 1$ data sequences from respective $N_a \geq 1$ antennas are received. At s2, $K \geq N_a$ signal data sequences are generated from the received data sequences. At s3, each one of the signal data sequences is filtered with a prefilter unit. At s4, the filtered data signal sequences are combined in a first combiner.

In one embodiment of the above method a sequence of known training symbols can be received at the $N_a \geq 1$ antennas. The coefficients of the prefilter units are set such that an error signal is minimized, wherein the error signal is obtained from the training sequence and a signal derived from an output signal of the first combiner. It can be implemented that the output signal of the first combiner is supplied to a first input of a second combiner, an output signal of the second combiner is supplied to a slicer, an output signal of the slicer is supplied to a feedback filter unit, and an output signal of the feedback filter unit is supplied to a second input of the second combiner, wherein the error signal is based on a difference signal between the training sequence and the output signal of the second combiner. In particular, in one embodiment the error signal is the mean square error between the training sequence and the output signal of the second combiner. The coefficients of the prefilter units and the feedback filter unit can be set such that the error signal is minimized. The difference signal between the training sequence and the output signal of the second combiner is then used in one embodiment to directly calculate filter coefficients to be input into the prefilter units or weight factors to be input into the prefilter units for setting the filter coefficients in the prefilter units.

In a further embodiment the generating of $K \geq N_a$ signal data sequences can comprise providing $K_1$ first signal data sequences with each one being identical to one of the received data sequences, respectively, and generating $K_2$ second signal data sequences with each one being not identical to any one of the received data sequences, respectively, wherein $K_1 + K_2 = K$.

In a further embodiment thereof, the $K_2$ signal data sequences comprise of one of the following: a real part of one of the received data sequences, an imaginary part of one of the received data sequences, one of the polyphases of one of the received data sequences, a real part of one of the polyphases of one of the received data sequences, and an imaginary part of one of the polyphases of one of the received data sequences. The one of the polyphases can be determined in one embodiment by determining which polyphase yields the lowest sampling timing error.

The above method according to FIG. 5 can be implemented by hardware, in particular with an interference suppression processing unit as depicted in one of FIGS. 1 to 3. However, the method can also be implemented by software or firmware. In particular, the method can be implemented by a computer program comprising program code sections for conducting the method as depicted in FIG. 5. The computer program can be stored on a computer-readable recording medium.

Figure 6:
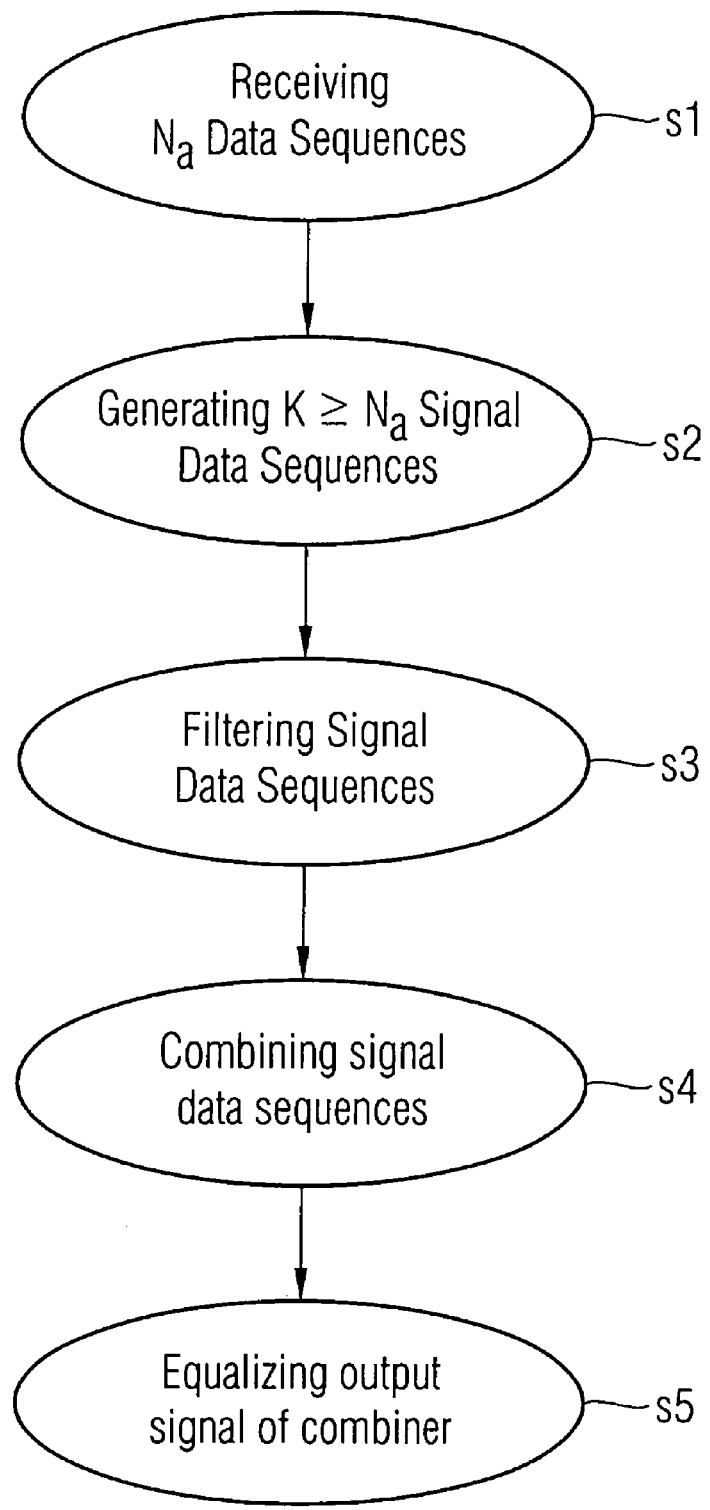
FIG. 6 shows a flow diagram of an embodiment of a method of suppressing interference of a received data signal and equalizing the received data signal in wireless data communication.

Referring to FIG. 6, there is shown a flow diagram of an embodiment of a method for suppressing interference of a received data signal and equalizing the received data signal in wireless data communication. At s1, $N_a \geq 1$ data sequences are received from respective $N_a \geq 1$ antennas. At s2, $K \geq N_a$ signal data sequences are generated from the received data sequences. At s3, each one of the signal data sequences is filtered with a prefilter unit. At s4, the signal data sequences are combined in a first combiner. At s5, an output signal of the first combiner is equalized.

In an embodiment thereof the coefficients of the prefilter units are set such that an error signal is minimized, wherein the error signal can be obtained from the training sequence and a signal derived from an output signal of the first combiner. Further on, the equalizing of the output signal of the first combiner may comprise supplying the output signal of the first combiner to a first input of a second combiner, supplying an output signal of the second combiner to a slicer, supplying an output signal of the slicer to a feedback filter unit, and supplying an output signal of the feedback filter unit to a second input if the second combiner, wherein the error signal can be based on a difference signal between the training sequence and the output signal of the second combiner. The coefficients of the prefilter units and the feedback filter unit can be set such that the error signal is minimized, wherein the error signal can is defined as the mean square error between the training sequence and the output signal of the second combiner.

In a further embodiment thereof the generating of $K \geq N_a$ signal data sequences can comprise providing $K_1$ first signal data sequences with each one being identical to one of the received data sequences, respectively, and the generating of $K_2$ second signal data sequences with each one being not identical to any one of the received data sequences, respectively, wherein $K_1 + K_2 = K$. Each one of the second signal data sequences can be comprised of one of the following: a real part of one of the received data sequences, an imaginary part of one of the received data sequences, one of the polyphases of one of the received data sequences, a real part of one of the polyphases of one of the received data sequences, and an imaginary part of one of the polyphases of one of the received data sequences. The polyphase is determined by determining the polyphase that yields the lowest sampling timing error.

The above method according to FIG. 6 can be implemented by hardware, in particular with an interference suppression processing unit as depicted in FIG. 2 or FIG. 3. However, the method can also be implemented by software or firmware. In particular, the method can be implemented by a computer program comprising program code sections for conducting the method as depicted in FIG. 6. The computer program can be stored on a computer-readable recording medium.

In the following, a further embodiment of a method of suppressing interference of a received data signal and equalizing the received data signal in wireless data communication will be outlined by referring again to FIG. 3. The following signal model will be used.

$$x^{(a)}(t) = \sum_i s_i \cdot h^{(a)}(t - iT) + w^{(a)}(t), a = 0, 1, \ldots, N_a - 1 \quad (1)$$

$x^{(a)}(t)$ is the received signal of the antenna a, $N_a$ is the number of the receiving antennas, $\{s_n\}$ is the sequence of the transmitted data symbols in the complex plane. The impulse response of the total channel $h^{(a)}(t)$ represents the effects of the transmitter filter, the wireless radio channel and the receiving filter of the antenna path a. T is the symbol period. $w^{(a)}(t)$ describes all disturbance effects as e.g. noise, interferences etc. of the antenna path a. After sampling with a sampling rate of M/T (M is the oversampling factor) one will receive the following discrete signal model:

$$\begin{aligned} x_{n,m}^{(a)} &= x^{(a)}\left(\left(n + \frac{m}{M}\right)T\right) \\ &= \sum_i s_i \cdot h^{(a)}\left(\left(n + \frac{m}{M} - i\right)T\right) + w^{(a)}\left(\left(n + \frac{m}{M}\right)T\right), \end{aligned} \quad (2)$$

$$m = 0, 1, \ldots, M - 1$$

In this equation n is the time index in the symbol rate and m is the index for the polyphase at time n. With the assumption that the impulse response has a length of L+1, one will obtain the discrete signal model in the following form:

$$x_{n,m}^{(a)} = \sum_{i=0}^{L} h^{(a)}\left(\left(i + \frac{m}{M}\right)T\right) \cdot s_{n-i} + w^{(a)}\left(\left(n + \frac{m}{M}\right)T\right) \quad (3)$$

As has already been explained in connection with the embodiment with FIG. 3, the $N_a$ received data sequences are converted in K (K≧$N_a$) different signal data sequences on K signal paths, wherein there may be generated signal data sequences which could be regarded as virtual antennas as they only contain part of the data stream of one of the received data sequences as, for example, real or imaginary part of a received data sequence or polyphase of a received data sequence. The filter coefficients or weight factors $w_i^{(1)} \ldots w_i^{(K)}$ can be calculated so that the mean square error (MSE) between the output of the prefilter core 20 (cf. FIG. 1) and the known training sequence is minimized. When calculating the filter coefficients there can also be considered temporal and spatial properties of data of the different antenna paths.

The output signal of the first combiner 30, i.e. the output signal of the prefilter core 20 having a filter order of N is given by $$y(n) = \underline{p}^H \cdot \underline{x}(n) = \sum_{k=1}^{K} (\underline{p}^{(k)})^H \cdot \underline{x}^{(k)}(n) \quad (4)$$

with the received signal vector $\underline{x}(n)$ $$\underline{x}(n) = (\underline{x}^{(1)}(n)^T, \ldots, \underline{x}^{(K)}(n)^T)^T$$

$$\underline{x}^{(k)}(n) = (x^{(k)}(n+N), \ldots, x^{(k)}(n))^T \quad (5)$$

and the prefilter coefficient $\underline{p}$ $$\underline{p} = ((\underline{p}^{(1)})^T, \ldots, (\underline{p}^{(K)})^T)^T$$

$$\underline{p}^{(k)} = (p_0^{(k)}, \ldots, p_N^{(k)})^T. \quad (6)$$

The signal z(n) after the second combiner 41 with the order L can be described as follows:

$$z(n) = y(n) - \underline{g}^H \cdot \underline{s}_2(n)$$

$$\underline{g} = (g_1, \ldots, g_L)^T$$

$$\underline{s}_2(n) = (s(n-1), \ldots, s(n-L))^T \quad (7)$$

g can be regarded as the new channel impulse response after the prefilter core 20.

The error between the filter output signal and the known training sequence is:

$$e(n) = z(n) - s(n)$$

The optimal filter coefficients can be derived from the solution of the minimum mean square error:

$$\begin{pmatrix} \underline{p} \\ -\underline{g} \end{pmatrix} = (A_{xs}^H \cdot A_{xs})^{-1} \cdot A_{xs}^H \cdot \underline{s}^*$$

$$A_{xs} = [A_x \ A_s]$$

$$A_x^H = (\underline{x}(n_t) \ \underline{x}(n_t + 1) \ \ldots \ \underline{x}(n_t + N_t - 1))$$

$$A_s^H = (\underline{s}_2(n_t) \ \underline{s}_2(n_t + 1) \ \ldots \ \underline{s}_2(n_t + N_t - 1))$$

$$\underline{s} = (s(n_t) \ s(n_t + 1) \ \ldots \ s(n_t + N_t - 1))^T,$$

wherein $n_t$ corresponds to the position of the first training symbol in a burst and $N_t$ corresponds to the number of the training symbols in a burst.

For calculating the filter coefficients p and g a matrix inversion of the dimension K·(N+1)+L becomes necessary. For suppressing interference with only one antenna there can, for example, be used only virtual antenna signal data (real or imaginary part and/or polyphase of received signal data) and K can be 2 or 4. For suppressing interference with e.g. two antennas, the number of real and virtual antenna signal data can be up to 8.

In a wireless communication terminal comprising, for example, two antennas, the interference suppression unit can be arranged such that it works with two active antennas as well as with only one active antenna. It can be implemented that the K values are different for interference suppression with one antenna or with two antennas. However, as this may be associated with high calculation effort, i.e. DSP code size or size of hardware), it would be advantageous if the K value does not have to be changed when changing from interference suppression with one antenna to two antennas or vice versa.

The training sequence transmitted within a normal GSM/EDGE burst is fairly short as it reduces the amount of payload which can be transmitted with a burst. As mentioned above, there are a lot of different signal data sequences, i.e. real and virtual antenna paths, from the received data sequences, in particular when two antennas are active. Some of these antenna paths may, however, have a rather high redundancy so that they may be omitted, i.e. they may not be generated by the signal generation unit. The signal generation unit thus only generates signal data sequences which are important for the suppression of the interference in one embodiment. In this way a number of the signal data sequences, i.e. the value of K, can be fixed independent of how many antennas are used for the suppression of the interference. This allows one to implement a prefilter core which can be used for interference suppression with one antenna as well as for interference suppression with two antennas which helps reduce the implementation effort.

For example, when using one antenna in case of a GMSK modulated signal with heavy co-channel interference, the following signal data sequences (virtual antennas) might be used (K=4):

$x_n^{(0)}$: I component of all data of 1. polyphase
$x_n^{(1)}$: Q component of all data of 1. polyphase
$x_n^{(2)}$: I component of all data of 2. polyphase
$x_n^{(3)}$: Q component of all data of 2. polyphase.

If two antennas are used in case of a GMBSK modulated signal with heavy co-channel interference, the best polyphase will be used instead of the first two polyphases. The four antenna paths can now be formed as follows:

$x_n^{(0)}$: I component of all data of best polyphase of antenna 1
$x_n^{(1)}$: Q component of all data of best polyphase of antenna 1
$x_n^{(2)}$: I component of all data of best polyphase of antenna 2
$x_n^{(3)}$: Q component of all data of best polyphase of antenna 2.

In case of a 8 PSK modulated signal with heavy co-channel interference or neighbouring channel interference, when using one antenna, it will be advantageous to use only the two polyphases as virtual antennas. In this case the two antenna paths are formed as follows:

$x_n^{(0)}$: all data of 1. polyphase
$x_n^{(1)}$: all data of 2. polyphase.

In case of two antennas one of the two polyphases can be omitted. In this case the two antenna paths are formed as follows:

$x_n^{(0)}$: all data of best polyphase of antenna 1
$x_n^{(1)}$: all data of best polyphase of antenna 2.

Before making a decision on which signal data sequences are to be generated by the signal generator unit, the type of interference of a received signal can be detected and independence on the detection result a decision is made on which antenna paths are to be formed. This makes it possible to obtain optimum interference reduction for the respective interference situation. For example, it can be detected beforehand whether the interference is a pure co-channel interface or whether it is essentially an adjacent channel interference. Signal types can be defined beforehand which correspond to certain threshold values of power or energy measured in predefined frequency ranges. For each of these signal types specific sets of antenna paths can be predetermined which the signal generator unit has to generate in case that a specific signal type has been detected. In this way an optimum interference suppression can be accomplished.

In addition, while a particular feature or aspect of an embodiment of the invention may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". The terms "coupled" and "connected", along with derivatives may have been used. It should be understood that these terms may have been used to indicate that two elements co-operate or interact with each other regardless whether they are in direct physical or electrical contact, or they are not in direct contact with each other. Furthermore, it should be understood that embodiments of the invention may be implemented in discrete circuits, partially integrated circuits or fully integrated circuits or programming means. Also, the term "exemplary" is merely meant as an example, rather than the best or optimal. It is also to be appreciated that features and/or elements depicted herein are illustrated with particular dimensions relative to one another for purposes of simplicity and ease of understanding, and that actual dimensions may differ substantially from that illustrated herein.

What is claimed is:

1. An interference suppression processing unit, comprising:
   $N_a \geq 2$ receiver paths configured to transmit respective $N_a \geq 2$ received data sequences received from respective $N_a \geq 2$ antennas;
   a signal generation unit configured to generate $K > N_a$ signal data sequences from the received data sequences;
   $K > N_a$ signal paths each configured to transmit one of the respective signal data sequences;
   a plurality of prefilter units, each coupled to one of the signal paths; and
   a combiner comprising $K > N_a$ input terminals that are each connected to an output terminal of one of the prefilter units,
   wherein the signal generation unit is configured to generate $K_1$ first signal data sequences, wherein each first signal data sequence is identical to one of the received data sequences, respectively, and $K_2$ second signal data sequences, wherein each second signal data sequence is not identical to any one of the received data sequences, respectively, and wherein $K_1+K_2=K$.

2. The processing unit of claim 1, wherein the $K_2$ signal data sequences are each comprised of one of the following:
   a real part of one of the received data sequences;
   an imaginary part of one of the received data sequences;
   one of polyphases of one of the received data sequences;
   a real part of one of the polyphases of one of the received data sequences; and
   an imaginary part of one of the polyphases of one of the received data sequences.

3. The processing unit of claim 2, wherein the signal generation unit is configured to determine the one of the polyphases by determining the polyphase that yields the lowest sampling timing error.

4. The processing unit of claim 1, wherein each prefilter unit comprises a linear, finite-impulse-response filter.

5. The processing unit of claim 1, wherein the signal generation unit is configured such that K is a fixed value.

6. An interference suppression and equalization processing apparatus, comprising:
   an interference suppression processing unit comprising $N_a \geq 2$ receiver paths configured to receive respective $N_a \geq 2$ received data sequences received from respective $N_a \geq 2$ antennas, a signal generation unit configured to generate $K > N_a$ signal data sequences from the received data sequences, $K > N_a$ signal paths configured to transmit each one of the signal data sequences, a plurality of prefilter units, each coupled to one of the signal paths, a first combiner comprising $K > N_a$ input terminals each one connected to an output terminal of one of the prefilter units, and an output terminal; and
   an equalization processing unit, comprising an input terminal connected to the output terminal of the first combiner, a slicer unit, and an output terminal coupled to the output of the slicer unit,
   wherein the signal generation unit is configured to generate $K_1$ first signal data sequences, wherein each first signal data sequence is identical to one of the received data sequences, respectively, and $K_2$ second signal data sequences, wherein each second signal data sequence is not identical to any one of the received data sequences, respectively, and wherein $K_1+K_2=K$.

7. The processing apparatus of claim 6, wherein the equalization processing unit comprises:
a second combiner comprising a first input terminal connected to the output terminal of the first combiner, and an output terminal;
the slicer unit comprising an input terminal connected to the output terminal of the second combiner; and
a feedback filter unit comprising an input terminal connected to the output terminal of the slicer unit, and an output terminal connected to a second input terminal of the second combiner, wherein the sign of an output signal of the feedback filter unit is changed when the output signal thereof is delivered to the second combiner.

8. The processing apparatus of claim 7, wherein the feedback filter unit comprises a linear, finite-impulse-response filter.

9. The processing apparatus of claim 7, further comprising:
a third combiner comprising a first input terminal connected to the output terminal of the second combiner, a second input terminal comprising an input for a training sequence, and an output terminal, wherein the sign of the output signal of the second combiner is changed when the output signal is delivered to the third combiner.

10. The processing apparatus of claim 9, further comprising:
a data processing unit comprising an input terminal connected to the output terminal of the third combiner, and K output terminals, wherein each output terminal is connected to a respective input terminal of one of the prefilter units.

11. The processing apparatus of claim 6, wherein the second signal data sequences are each comprised of one of the following:
a real part of one of the received data sequences;
an imaginary part of one of the received data sequences;
one of polyphases of one of the received data sequences;
a real part of one of the polyphases of one of the received data sequences; and
an imaginary part of one of the polyphases of one of the received data sequences.

12. The processing apparatus of claim 11, wherein the signal generation unit is configured to determine the one of the polyphases by determining the polyphase that yields the lowest sampling timing error.

13. The processing apparatus of claim 6, wherein each prefilter unit comprises a linear, finite-impulse-response filter.

14. The processing apparatus of claim 6, wherein the signal generation unit is configured such that K is a fixed value.

15. A method of suppressing interference of a received data signal in wireless data communication, comprising:
receiving $N_a \geq 2$ data sequences from respective $N_a \geq 2$ antennas;
generating $K > N_a$ signal data sequences from the received data sequences;
filtering each one of the signal data sequences with a respective one of a plurality of prefilter units; and
combining the filtered signal data sequences in a first combiner,
wherein generating $K > N_a$ signal data sequences comprises:
providing $K_1$ first signal data sequences, wherein each first signal data sequence is identical to one of the received data sequences, respectively, and
generating $K_2$ second signal data sequences, wherein each second signal data sequence is not identical to any one of the received data sequences, respectively, wherein $K_1+K_2=K$.

16. The method of claim 15, further comprising:
receiving a training sequence of known training symbols at the $N_a \geq 2$ antennas; and
setting coefficients of the prefilter units such that an error signal is minimized, wherein the error signal is obtained from a difference between the training sequence and a signal derived from an output signal of the first combiner.

17. The method of claim 16, further comprising:
supplying the output signal of the first combiner to a first input of a second combiner;
supplying an output signal of the second combiner to a slicer;
supplying an output signal of the slicer to a feedback filter unit; and
supplying an output signal of the feedback filter unit to a second input of the second combiner, wherein the error signal is based on a difference signal between the training sequence and the output signal of the second combiner.

18. The method of claim 17, further comprising:
setting coefficients of the prefilter units and the feedback filter unit such that the error signal is minimized.

19. The method of claim 17, wherein the error signal comprises a mean square error between the training sequence and the output signal of the second combiner.

20. The method of claim 15, wherein the $K_2$ signal data sequences are each comprised of one of the following:
a real part of one of the received data sequences;
an imaginary part of one of the received data sequences;
one of the polyphases of one of the received data sequences;
a real part of one of the polyphases of one of the received data sequences; and
an imaginary part of one of the polyphases of one of the received data sequences.

21. The method of claim 20, further comprising:
determining the one of the polyphases by determining the polyphase that yields the lowest sampling timing error.

22. A method of suppressing interference of a received data signal and equalizing the received data signal in wireless data communication, comprising:
receiving $N_a \geq 2$ data sequences from respective $N_a \geq 2$ antennas;
generating $K > N_a$ signal data sequences from the received data sequences;
filtering each one of the signal data sequences with a respective one of a plurality of prefilter units;
combining the filtered signal data sequences in a first combiner; and
equalizing an output signal of the first combiner,
wherein generating $K > N_a$ signal data sequences comprises:
providing $K_1$ first signal data sequences, wherein each first signal data sequence is identical to one of the received data sequences, respectively, and
generating $K_2$ second signal data sequences, wherein each second signal data sequence is not identical to any one of the received data sequences, respectively, wherein $K_1+K_2=K$.

23. The method of claim 22, further comprising:
receiving a training sequence of known training symbols at the $N_a \geq 2$ antennas; and setting coefficients of the prefilter units such that an error signal is minimized, wherein the error signal is obtained from the training sequence and a signal derived from an output signal of the first combiner.

24. The method of claim 23, wherein equalizing the output signal of the first combiner comprises:
   supplying the output signal of the first combiner to a first input of a second combiner;
   supplying an output signal of the second combiner to a slicer;
   supplying an output signal of the slicer to a feedback filter unit; and
   supplying an output signal of the feedback filter unit to a second input of the second combiner, wherein the error signal is based on a difference signal between the training sequence and the output signal of the second combiner.

25. The method of claim 24, further comprising setting coefficients of the prefilter units and the feedback filter unit such that the error signal is minimized.

26. The method of claim 24, wherein the error signal comprises a mean square error between the training sequence and the output signal of the second combiner.

27. The method of claim 22, wherein the second signal data sequences are each comprised of one of the following:
   a real part of one of the received data sequences;
   an imaginary part of one of the received data sequences;
   one of polyphases of one of the received data sequences;
   a real part of one of the polyphases of one of the received data sequences; and
   an imaginary part of one of the polyphases of one of the received data sequences.

28. The method of claim 27, further comprising:
   determining the one of the polyphases by determining the polyphase that yields the lowest sampling timing error.

* * * * *